Patented Nov. 27, 1934

1,982,340

UNITED STATES PATENT OFFICE 1,982,340

FREQUENCY MEASURING SYSTEM

Henry C. Forbes, Longmeadow, Mass., assignor to Westinghouse Electric & Manufacturing Company, a corporation of Pennsylvania Application August 19, 1930, Serial No. 476,339

4 Claims. (Cl. 250—39)

The increasing demand for radio communication and numerous applications of it, within the past few years, has created a need for many more radio channels than are now available. The only way to increase the number of channels is by decreasing the width of existing channels. However, this is not a desirable manner of solving the problem, as the width of a broadcasting channel has its minimum limits, determined by the frequencies within the audio-frequency range. To compensate more or less for the present deficiency in the existing conditions, present radio regulations allow for only a small variation of a station frequency from its assigned frequency, and still smaller tolerances may be expected in the future.

It becomes desirable, therefore, to check up on the various transmitting stations to determine whether they are transmitting within their assigned limits. Precision methods of frequency control and frequency measurement have been developed, whereby the frequency of a station may be determined, but the procedure involved is usually a cumbersome one.

In the broadcast band, frequency control is especially important because of heterodyne interference produced when a station shifts appreciably from its assigned wave-length. During the adjustment of a transmitter, means of measuring its absolute frequency with a high-degree of accuracy is needed. Periodic frequency measurements are required once a day in many high-grade transmitters. Under some conditions, it is desirable to measure the frequency of a number of stations from one location where signals from each may be received.

It is, accordingly, one object of my invention to provide a method whereby accurate and dependable frequency measurements may be made.

Another object of my invention is to provide means for practicing the above method.

Another object of my invention is to provide a combination and a cooperation of elements to ensure the desired results.

Another object of my invention is to provide means whereby accurate frequency measurements may be determined in a relatively short space of time.

Another object of my invention is to provide means, in a frequency-measuring system, for accurately determining the frequency of current in the lower audio-frequency range.

Other objects of my invention will be disclosed in the following description of my invention, taken in conjunction with the accompanying drawing wherein.

Figure 1:
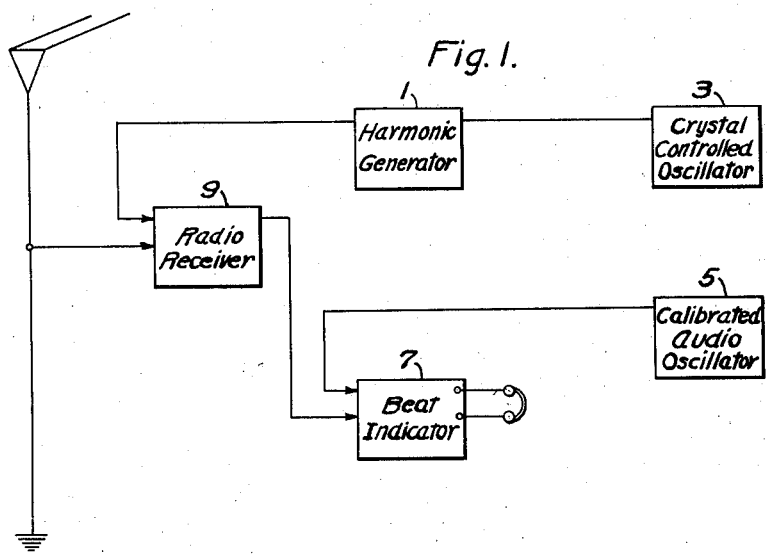
Figure 1 is a diagrammatic view of a combination of elements comprising a frequency-measuring system.

In Fig. 1, is disclosed a combination of elements comprising a multivibrator or harmonic generator 1 controlled by a crystal-controlled oscillator 3; a calibrated oscillator 5, a beat indicator 7 and a radio receiver 9. An incoming signal, the frequency of which it is desired to measure, is received in the usual manner by the receiver. Into the receiver are inserted all the multiple frequencies or harmonics derived from the multivibrator which normally is adjusted for a fundamental frequency of 10 kilo-cycles. This multivibrator, as stated above, is accurately controlled by the crystal oscillator adjusted to a frequency of 30 kilo-cycles, this oscillator being accurate to a high degree.

The presence, in the receiver, of the signal current and the current from the multivibrator, which contains a plurality of frequencies, will result in the production of a plurality of beats in the output circuit of the receiver. For example, if the incoming signal should be of an assigned frequency of one million cycles and, assuming an error of plus 500 cycles, thereby making the frequency 1,000,500 cycles, several beat notes will be produced in the receiver output. The beat between the signal and the 100th harmonic of the multivibrator fundamental will be 500 cycles. Between the signal and 99th harmonic, a beat note of 10,500 cycles will be produced, and between the signal and the 101 harmonic, a beat of 9,500 cycles will be produced, etc. These beat notes are fed to the beat indicator, wherein at least one of the beat notes, preferably one lying within the audio-frequency range, is compared with a current of known audio frequency. The audio-frequency current is generated in an oscillator 5, calibrated to indicate the frequency of the generated current. The frequency of the current generated in the calibrated oscillator 5 may be so adjusted as to zero beat with one of the beat notes fed to the beat indicator 7 from the radio receiver 9. In the particular example set forth above, the frequency of the current from the control oscillator 3 will be adjusted to a frequency of 500 cycles, whereby a zero beat will be obtained between that current and the 500 cycle beat note supplied from the receiver. As an additional alternative, the frequency of the current from the calibrated oscillator 5 may be adjusted to either 9,500 cycles or 10,500 cycles to zero beat, with a corresponding beat note from the receiver 9. However, it is preferable to adjust the frequency of the calibrated oscillator output current to that of the lowest audio-frequency beat note supplied to the beat receiver, as the chance of error or misinterpretation of beat notes is materially reduced.

The measurement then consists of determining a particular harmonic with which the signal is beating and a measurement of the audio-frequency beat note.

The particular harmonic of the multivibrator 1 that is producing the beat note with the incoming signal may be determined in several ways. The preferred method consists in the use of a heterodyne-frequency meter of the usual type. This meter is a calibrated oscillator, which may be so set as to zero-beat the harmonic of the multivibrator that is producing the beat note, as observed in the receiver. The frequency of the harmonic may be read directly from the scale on the heterodyne meter with sufficient accuracy to determine which harmonic it is. Having determined the harmonic, it is then necessary to determine whether the beat-frequency reading, as obtained from the calibrated audio oscillator 5, should be added to, or subtracted from, the frequency of this harmonic, in order to determine the frequency of the incoming signal. This may be determined most easily by noting in which direction the heterodyne-frequency-meter dial must be moved in order to zero beat the incoming signal, after having been once tuned to the harmonic producing the beat. For instance, if the heterodyne-frequency-meter has been tuned to the 100th harmonic of the multivibrator 1, that is, to 1,000,000 cycles, and it is noted that the dial is moved in the direction which increases the frequency in order to zero-beat the incoming signal, then the incoming signal is of a frequency which is higher than the harmonic producing the beat, and the audio-frequency beat note is then added to the frequency of the harmonic of the multivibrator 1.

The same result may be obtained by causing the receiver 9 to oscillate (auto-dyne reception) and noting which way the receiver-detector tuning dial is moved in order to zero-beat the harmonic after having been previously so tuned as to zero-beat the incoming signal.

The accuracy of the measurements obtained by means of the above arrangement of elements is determined by, first, the accuracy of the crystal oscillator 3, second, the accuracy of the audio oscillator 5, and third, the accuracy with which the zero beat between the audio oscillator 5 and the beat frequency can be measured. The accuracy of a crystal-controlled oscillator 3 is readily limited to an error of one part in 100,000. The accuracy with which the zero beat may be measured can be determined within one cycle. As regards the audio oscillator 5, however, its accuracy is less than that of the crystal-control oscillator 3 and it is subject to possible inaccuracies of the order of 5/10ths of one percent. For the higher radio-frequency measurements, these slight inaccuracies have no appreciable effect on the accurate determination of the frequency of a measured signal. For the lower radio frequencies, however, an error of 5/10ths of 1% in the accuracy of the audio oscillator 5 may produce appreciable error in the determination of the frequency of a measured signal. The following example will serve to illustrate the effect of slight inaccuracy in the audio oscillator in the determination of high radio frequencies and in the determination of low radio frequencies. Assuming the error in the calibration of the audio-oscillator 5 to be 5 cycles in 500 cycles, the error in the frequency measurement, in the case noted above, would be $$\frac{1,000,505 - 1,000,500}{1,000,500}$$

which equals .0000049 or .00049%. This is approximately 0.5 parts in 100,000 which, for most purposes, may be neglected. At a frequency measurement at 10,500 cycles, however, which frequency lies within the range of the lower radio frequencies, the error would be $$\frac{10,505 - 10,500}{10,500}$$

which equals .00047 or .047%. This is equal to 47 parts in 100,000. Obviously, therefore, the accuracy of measurement of frequency in the lower radio-frequency range is determined practically by the accuracy of the audio oscillator 5. Therefore, it would be desirable, when measuring frequencies lying within the range of the lower radio frequencies, to utilize an audio oscillator which is not susceptible to the variations noted above. It is also desirable to utilize such an audio-oscillator, which is capable of measuring frequencies from 5 to 100 cycles with accuracy, as it often occurs that the frequency of a broadcasting station will differ from one of the harmonics of the frequency generator by only a few cycles. Ordinary audio-oscillators do not measure frequencies of that order.

To overcome some of these difficulties and to provide means for measuring frequencies of the order of 5 to 100 cycles with accuracy, I provide, in lieu of the ordinary audio-frequency oscillator 5 as shown in Fig. 1, an adjustable oscillator 11 capable of generating currents at frequencies ranging from 30 kilo-cycles to 35 kilo-cycles. By adjusting the output of this oscillator 11 to any desired frequency within the above range for which it is designed, and then beating the output current with the output current of the 30 kilo-cycle crystal-controlled oscillator 3, I can obtain a resultant beat current having a frequency, anywhere between zero and 5,000 cycles, depending upon the adjustment of the adjustable oscillator 11, which may be calibrated in terms of beat frequencies.

A part of the output current of the 30 kilocycle standard oscillator 3 is fed through a balanced amplifier to a detector. The output of the variable oscillator 11 is fed through a separate balanced amplifier to the same detector where the two currents are rectified and the beat frequency produced. The both amplifiers and the detector are designated by reference numeral 13.

Figure 2:
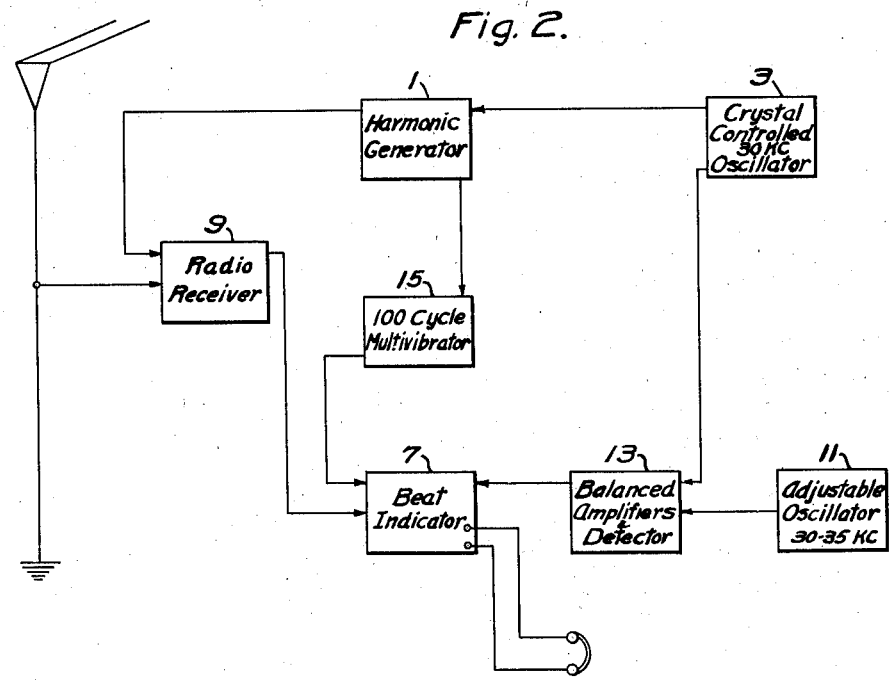
Fig. 2 is a view illustrative of my invention as embodied in a modification of the system shown in Fig. 1.

This current may then be fed to the beat indicator 7 whereby it may be utilized as a standard of comparison with the beat notes fed from the radio receiver 9. The above modification, which is disclosed in Fig. 2, provides for continuous adjustment between zero and 5,000 cycles, by the use of a single control, if desired. It provides means whereby beat frequencies of the order of zero to 100 cycles may be produced. The zero indication on the adjustable oscillator 11 may be compared and calibrated directly with the crystal-controlled oscillator 3, thus providing an accuracy of zero setting comparable to the accuracy of the standard or crystal-controlled oscillator, which is readily made accurate to the extent of 1 part in 100,000. It provides a means whereby rapid measurements are made possible and also any discrepancies or drift of the variable-beat oscillator 11 may be quickly corrected or checked by readjusting the zero position, for example, by comparison with the crystal-controlled oscillator 3 in the arrangement of elements described and set forth above. It will be observed that the 30 kilo-cycle control oscillator 3 performs two functions; namely, that of controlling the 10 kilo-cycle oscillator 1 and that of producing low audio-frequency beat notes with the adjustable oscillator 11.

By means of the above arrangement, I thereby insure that the input to the beat indicator 7 will be accurate and dependable, as a standard for measuring purposes.

To provide calibration means for the adjustable oscillator 11, a second multivibrator or harmonic generator 15 may be provided, to be controlled by the 10 kilo-cycle multivibrator 1, so that 100 cycle calibration points for the audio oscillator may be provided. This feature does not constitute a part of my invention but forms the subject matter of application, Serial No. 523,482, filed March 18, 1931, by V. J. Andrew and assigned to Westinghouse Electric and Manufacturing Company.

While I have described my system as comprising elements of a particular nature embodying certain standardized circuits, it is apparent that any circuits capable of functioning in the same manner may be substituted in lieu of the equivalent circuits referred to in the description of the drawing.

In lieu of the crystal-controlled oscillator, for example; any oscillator possessing sufficient accuracy for this purpose may be used. In lieu of the multivibrator circuits mentioned, I may use any means for distorting current of fundamental frequency and producing non-sinusoidal waves, whereby to obtain a plurality of harmonics.

Furthermore, I may utilize standard measuring frequencies other than those used in my preferred embodiments.

Therefore, while I have disclosed my invention in great detail, I do not desire to be limited to such except insofar as may be necessitated by the prior art and the spirit of the appended claims.

I claim as my invention:

1. In frequency-measuring apparatus, means for generating a nonsinusoidal current of definite frequency whereby a plurality of harmonics are formed, adjustable means for producing currents at one of a number of desired frequencies, means for controlling said first mentioned generator, said last mentioned means also comprising means for creating a beat frequency with the output current of said second mentioned generator and means for utilizing the output of said nonsinusoidal current generator, and said beat frequency to measure the frequency of a wave of unknown frequency.

2. In a frequency-measuring system, means for generating a nonsinusoidal current containing a plurality of harmonics, adjustable means for selectively producing current at one of a number of desired frequencies, means, comprising a crystal-controlled oscillator, for controlling said generating means, said last mentioned means also comprising means for creating a beat frequency with the output current of said adjustable means and means for utilizing the output of said non-sinusoidal current generator, and said beat frequency to measure the frequency of a wave of unknown frequency.

3. In a frequency-measuring system, means comprising a multivibrator for generating a non-sinusoidal current containing a plurality of harmonics, adjustable means for selectively producing current at one of a number of desired frequencies, means for controlling said multivibrator, said last mentioned means also comprising means for creating a beat frequency with the output current of said adjustable means and means for utilizing the output of said non-sinusoidal current generator, and said beat frequency to measure the frequency of a wave of unknown frequency.

4. In a frequency-measuring apparatus, means for generating a non-sinusoidal current of definite frequency whereby a plurality of harmonics are formed, adjustable means for producing currents at one of a number of desired super-audio frequencies, means for controlling said first mentioned generator, said last mentioned means also comprising means for creating an audio beat frequency with the output current of said second mentioned generator, and means for utilizing the output of said non-sinusoidal current generator, and said beat frequency to measure the frequency of a wave of unknown frequency.

HENRY C. FORBES.